US007890981B2

(12) United States Patent
Quere et al.

(10) Patent No.: US 7,890,981 B2
(45) Date of Patent: Feb. 15, 2011

(54) METHOD FOR AUTOMATICALLY DETECTING AN ANTENNA SYSTEM FOR SATELLITE RECEIVERS

(75) Inventors: Thierry Quere, Montfort sur Meu (FR); Sébastien Fraleu, Noyal sur Vilaine (FR); André Magras, St Grégoire (FR)

(73) Assignee: Thomson Licensing, Boulogne-Billcourt (FR)

( * ) Notice: Subject to any disclaimer, the term of this patent is extended or adjusted under 35 U.S.C. 154(b) by 845 days.

(21) Appl. No.: 11/126,929

(22) Filed: May 11, 2005

(65) Prior Publication Data

US 2005/0283808 A1 Dec. 22, 2005

(30) Foreign Application Priority Data

May 14, 2004 (FR) .................................. 04 50949

(51) Int. Cl.
*H04N 7/20* (2006.01)

(52) U.S. Cl. .......................................... 725/69; 725/72

(58) Field of Classification Search .................. 725/69, 725/72

See application file for complete search history.

(56) References Cited

U.S. PATENT DOCUMENTS 5,313,215 A * 5/1994 Walker et al. ............... 342/352
5,583,514 A * 12/1996 Fulop ......................... 342/359
5,585,804 A * 12/1996 Rodeffer ..................... 342/359
5,587,717 A * 12/1996 Jang ........................... 342/359
6,205,185 B1 * 3/2001 Kajiwara .................... 375/316
6,226,494 B1 * 5/2001 Lundstrom et al. ......... 455/13.1
6,693,587 B1 2/2004 Kuether et al.
6,950,629 B2 * 9/2005 Nagy ........................ 455/63.4
7,098,859 B2 * 8/2006 Shimawaki et al. ... 343/781 CA
2004/0093617 A1 5/2004 Horr et al.
2006/0097940 A1 * 5/2006 Shimawaki et al. ......... 343/761
2007/0294731 A1 * 12/2007 Arsenault et al. ............. 725/70

FOREIGN PATENT DOCUMENTS

FR 2 733 870 A 11/1996

OTHER PUBLICATIONS

XP002308358 “Diseqc 2.0 fuer Techniker”.
Patent Abstracts of Japan 11 187322.
Search Report.

* cited by examiner

*Primary Examiner*—Christopher Kelley
*Assistant Examiner*—Franklin S Andramuno
(74) *Attorney, Agent, or Firm*—Robert D. Shedd; Joseph J. Opalach; Brian J. Cromarty

(57) ABSTRACT

The invention makes configuring satellite decoders easier. An automatic detection method can configure the decoder without having to determine the installation beforehand. The automatic detection method tests different configuration possibilities in order to determine the used antenna system. A series of input selection commands are sent for a remote antenna switch corresponding to a given range of switch control possibilities, the said range being independent from the used antenna system.

8 Claims, 3 Drawing Sheets

METHOD FOR AUTOMATICALLY DETECTING AN ANTENNA SYSTEM FOR SATELLITE RECEIVERS

This application claims the benefit, under 35 U.S.C. §119 of French Patent Application 0450949, filed May 14, 2004.

FIELD OF THE INVENTION

The invention relates to a method for automatically detecting an antenna system for satellite receivers.

DESCRIPTION OF THE PRIOR ART

Satellite television requires a special satellite receiver to receive the programmes broadcast by satellites, such receivers are generally called satellite decoders or STB (Set Top Box). Several satellites can be viewed from a given geographic location. Decoders are commercialised to be able to receive the signals coming from different satellites. It is therefore possible to couple a decoder to one or more fixed or rotating antennas to be able to receive the programmes from different satellites.

FIG. 1 shows an example of a satellite installation that comprises a decoder 1 coupled to a television 2 to receive signals from two fixed antennas 3 and 4 and a motorised rotating antenna 5. The antennas 3 to 5 are connected to the decoder by a switch 6. To control this installation, the decoder must be configured to be informed that the installation has several antennas coupled to a switch and a minimum amount of knowledge of the antenna system used is required. Moreover, if one counts all the possibilities offered, the configuration menu becomes relatively complex and may require the presence of a specialist engineer. Moreover, if the antenna system is common to several decoders placed in a single building, an installer does not necessarily know the installation.

The invention proposes to make configuring the satellite decoders easier. An automatic detection method can configure the decoder without having to determine the installation beforehand. The automatic detection method tests different configuration possibilities in order to determine the configuration.

SUMMARY OF THE INVENTION

The invention is a method for automatically detecting an antenna system for satellite receivers that sends a series of input selection commands for a remote antenna switch corresponding to a given range of switch control possibilities, the said range being independent from the antenna system used.

Preferentially, the series of selection commands is sent with at least one series of frequency positioning controls carrying out a satellite band scan, the said positioning controls being inserted between the said selection commands. The series of selection commands is sent with frequency and polarisation positioning controls corresponding to memorized satellite service channels, the said positioning controls being inserted between the said selection commands. At least one azimuth motion control is sent independently from the presence or absence of an azimuth elevation motorised antenna. At least one azimuth motion control sequence is sent independently from the presence or absence of an azimuth elevation motorised antenna.

BRIEF DESCRIPTION OF THE DRAWINGS

The invention will be better understood, and other specific features and advantages will emerge from reading the following description, the description making reference to the annexed drawings wherein.

DESCRIPTION OF THE PREFERRED EMBODIMENTS

Figure 1:
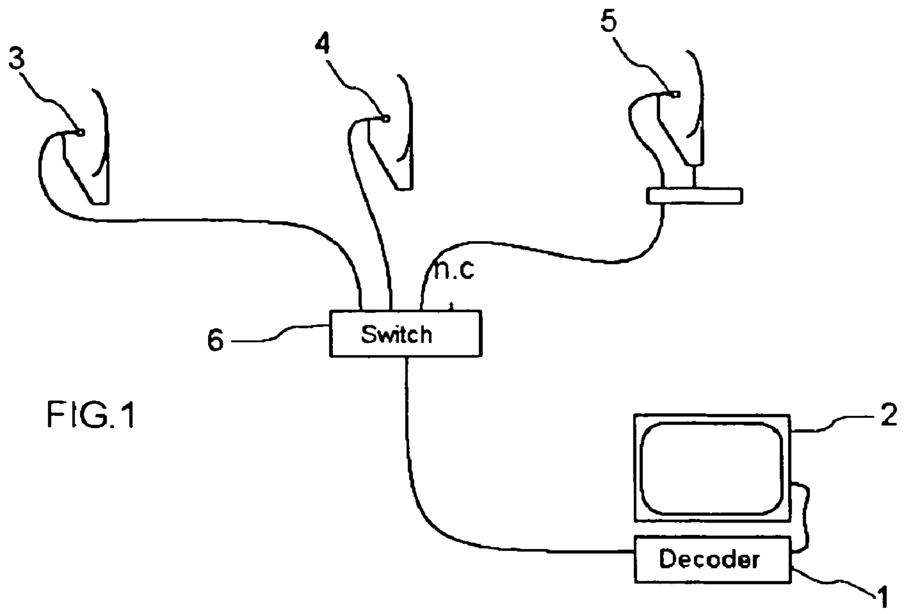
FIG. 1 shows an example of a satellite receiver installation.
Figure 2:
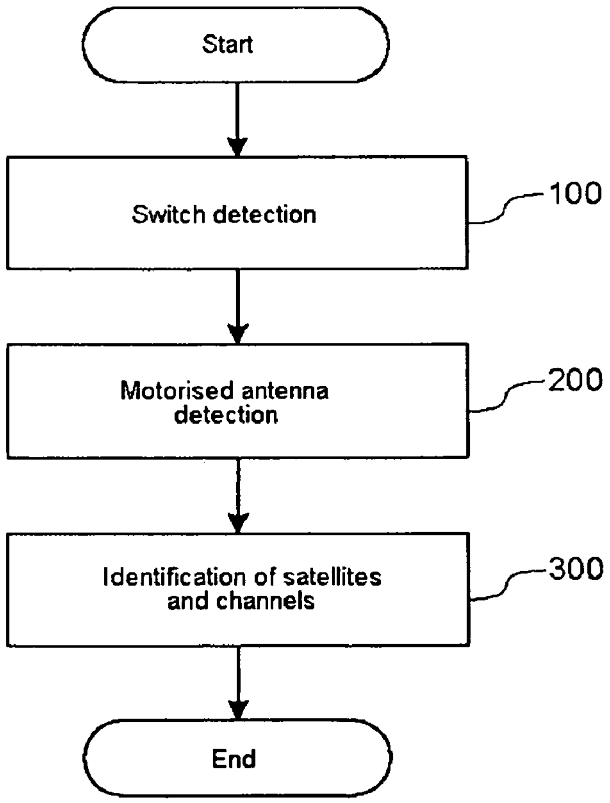
FIGS. 2 to 4 show the different flow diagrams used by a preferred method realized according to the invention.
Figure 3:
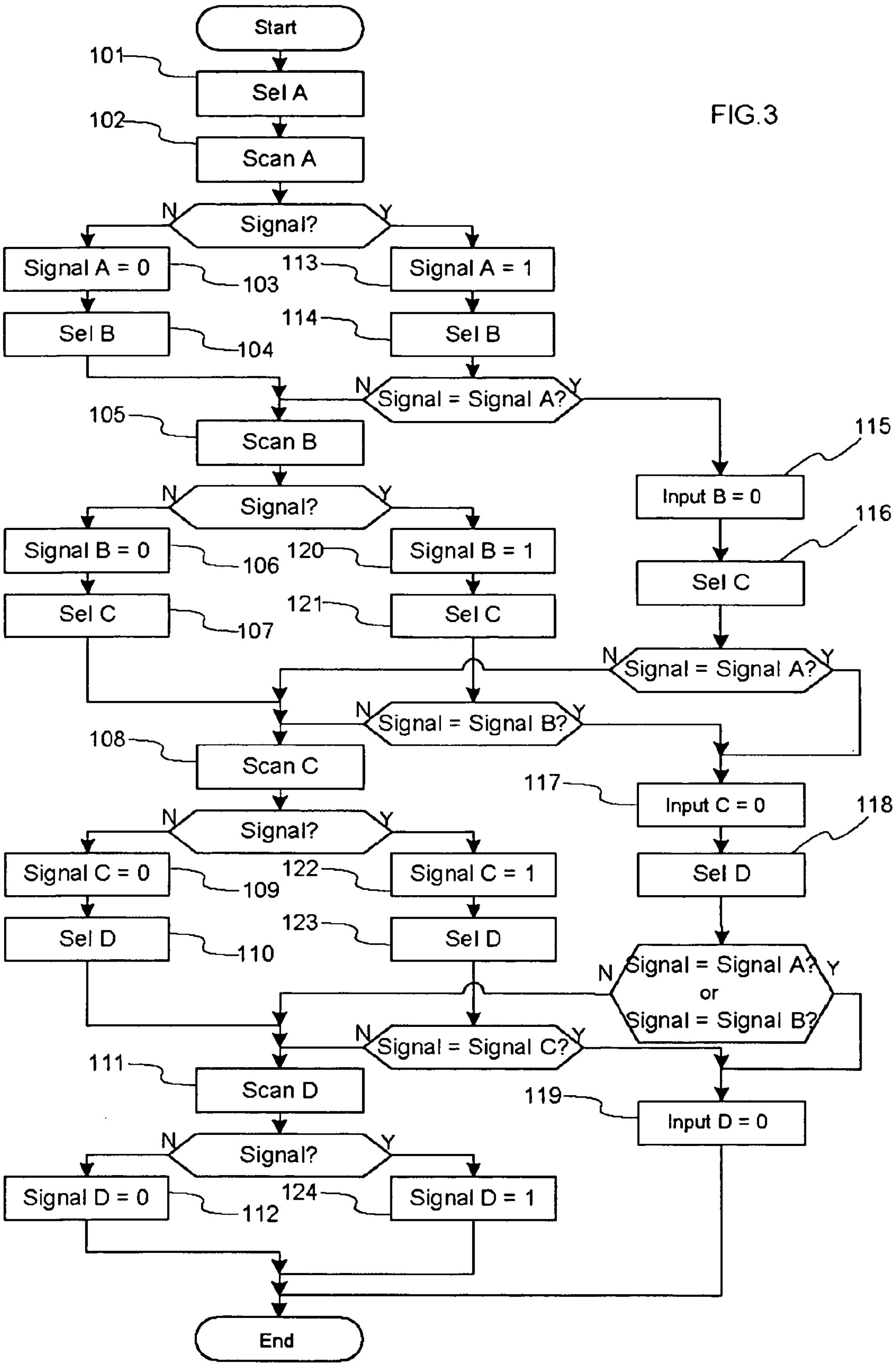
Figure 4:
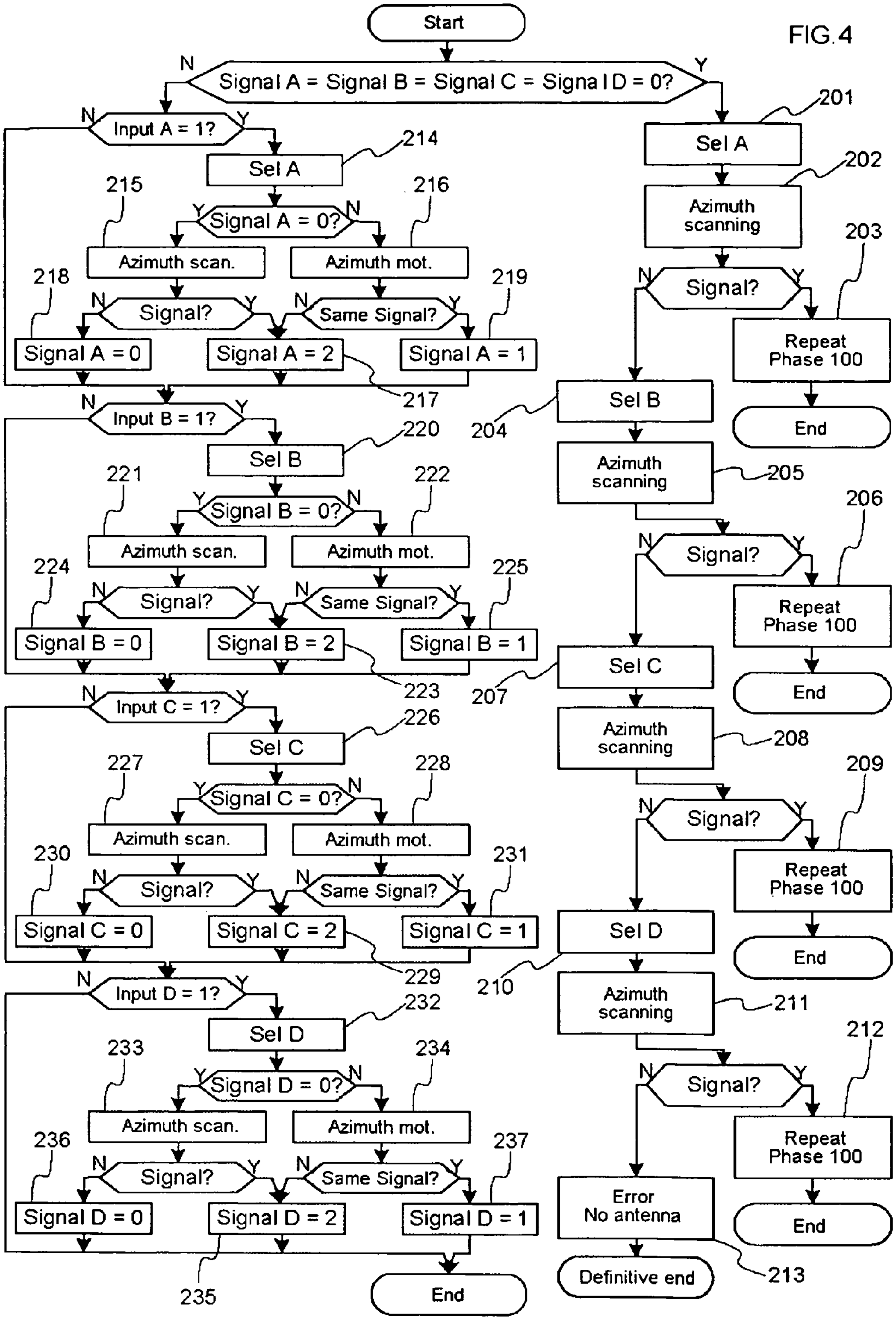

The method according to the invention can detect the entire installation constituting an antenna system to which a decoder is connected. The decoder itself will carry out a complete analysis of the system and automatically configure itself. FIG. 2 shows an overall auto-configuration flow diagram that comprises a first switch detection phase 100, a second motorised antenna detection phase 200 and a third satellite and channel identification phase 300. This flow diagram corresponds to an auto-configuration program that is run by a processor of the decoder. The user only has to run the auto-configuration of the decoder and wait, which is relatively simple.

Firstly, it should be remembered that the DiSEqC standard is a standard that enables commands to be transmitted to an antenna system. Among the DiSEqC commands, it must be recalled that they comprise:

- commands for the antenna transposition circuit commonly called LNB (Low Noise Block) that can select the polarisation of the waves received and the part of the satellite band transposed into intermediate band,
- switch commands that enable a switch to be addressed, or cascaded switches enabling up to four inputs to be addressed, commonly called A, B, C and D,
- motion commands for mobile azimuth elevation motorised antennas.

The DiSEqC standard is the standard most used for satellite reception antenna but other commands can also be used. In the present description, abstraction is made of there being several types of command other than the DiSEqC standard in order not to make the description unnecessarily cumbersome. Since, as those skilled in the art will note, the method implemented considers in its first approach that all the possibilities offered are used.

For DiSEqC, it is possible to have up to four switched antennas. In the detection method that will be detailed hereafter, four variables representative of any switch input(s) will be used: Input A, Input B, Input C and Input D, each of these variables can have the value "1" representative of the presence of this input on a switch, or the value "0" representative of the absence of the input. Considering that for each entry, it is possible to have a fixed or motorised antenna or no antenna, each possible switch input is assigned a signal variable: Signal A, Signal B, Signal C and Signal D, each of these variables being able to take the value "0" representative of the absence of the antenna, the value "1" representative of a fixed antenna or even the value "2" representative of a motorised antenna.

Before running the auto-configuration, it is considered that there are switches with four inputs, the Input A, Input B, Input C and Input D variables are all set to the state "1".

Phase 100 is first carried out, in which only switches with fixed antennas are considered. During the first step 101, the command that selects input A is sent, if there is a switch, this switch will be set to the corresponding input, otherwise this command will have no effect. Next, a second step 102 is carried out that consists of performing a rapid scan of the satellite band. The rapid scan is for example realised by using a relatively large pitch or only on frequencies and polarisations corresponding to the service channels of each known satellite, this step terminates after scanning the entire band (or all the tested frequencies) or as soon as a channel is found.

If no channel has been found at the end of the second step 102, then the Signal "A" variable is marked as equal to "0" during a third step 103. Then, during a fourth step 104, a selection command of an input B is sent. Then a fifth scanning step 105 identical to the second step 102 is carried out.

If, at the end of the fifth step 105, no channel has been found, then the Signal B variable is marked as equal to "0" during a sixth step 106. Then, during a seventh step 107, a selection command of an input C is sent. Then an eighth scanning step 108 identical to the second step 102 is carried out.

If no channel has been found at the end of the eighth step 108, then the Signal C variable is marked as equal to "0" during a ninth step 109. Then, during a tenth step 110, a selection command of an input D is sent. Then an eleventh scanning step 111 identical to the second step 102 is carried out.

If no channel has been found at the end of step 111, the Signal D variable is marked as equal to "0" during a twelfth step 112.

If a channel was found at the end of step 102, the Signal A variable is marked as equal to "1" during a thirteenth step 113. Still during the third step 113, information relating to the channel received is memorized, among other things the identification of the channel but also the receiver power, error rate and possibly equalisation parameters. Then, during a fourteenth step 114, the selection command of an input B is sent, without changing the channel selected. If, just after selecting input B, a signal is received that corresponds to the same signal as signal A whose parameters are memorized, then the Input B variable is marked as equal to "0" during a fifteenth step 115. Indeed, if for the same channel polarisation and frequency, the channel received is the same with the same power and equalisation parameters, then this can only be the same antenna so the input the selection command of the input B is without effect and there is therefore no input B. Then, during a sixteenth step 116, the input C selection command is sent without changing the channel selected. If, just after selecting input C, a signal is received that corresponds to the same signal as signal A whose parameters are still memorized, then the input C variable is marked as equal to "0" during a seventeenth step 117. Then, during an eighteenth step 118, the selection command of the input D is sent, without changing the channel selected. If, just after selecting input D, a signal is received that corresponds to the same signal as signal A whose parameters are still memorized, then the Input D variable is marked as equal to "0" during a nineteenth step 119.

However, if no signal, or a different signal from the one memorized, is received after the fourteenth step 114 then the fifth step 105 is carried out.

If, a channel is found at the end of the fifth step 105, then the Signal B variable is marked as being equal to "1" during a twentieth step 120. During the twentieth step 120, the information relating to the channel received is memorized, in an identical manner to that of the thirteenth step 113. Then, during a twenty-first step 121, the selection command of an input C is sent without changing the channel selected. If, just after selecting input C, a signal is received that corresponds to the same signal as signal B whose parameters are still memorized, then the input C variable is marked as equal to "0" during the seventeenth step 117. Then, during an eighteenth step 118, the input D selection command is sent without changing the channel selected. If, just after selecting input D, a signal is received that corresponds to the same signal as signal B whose parameters are still memorized, then the Input D variable is marked as equal to "0" during a nineteenth step 119.

However, if no signal, or a different signal from the one memorized, is received after the twenty-first step 121, then the eighth step 108 is carried out.

If, a channel is found at the end of the eighth step 108, then the Signal C variable is marked as being equal to "1" during a twenty-second step 122. During the twenty-second step 122, the information relating to the channel received is memorized, in an identical manner to that of the thirteenth step 113. Then, during a twenty-third step 123, the selection command of an input D is sent without changing the channel selected. If, just after selecting input D, a signal is received that corresponds to the same signal as the signal C whose parameters are still memorized, then the Input D variable is marked as equal to "0" during a nineteenth step 119.

However, if no signal, or a different signal from the one memorized, is received after the twenty-third step 123, then the eleventh step 111 is carried out.

If a channel has been found at the end of step 111, the Signal D variable is marked as equal to "1" during a twenty-fourth step 124.

Normally, if a switch is present, it has two or four switched inputs or may comprise two or three switches with two cascaded inputs. The manner in which the selection command is composed means that, normally, input A is always an input used as soon as a switch is also used, it is possible to consider the first phase 100 as being terminated at the end of the twelfth step 112, the nineteenth step 119 or the twenty-fourth step 124. If the signal A variable equals "1", this means that there is indeed an input A. If the Input B, Input C and Input D variables are all equal to "0", this means that there is no switch.

The switches are normally identified at the end of the first phase 100. However, it is possible that the final result is not reliable, as one or more motorised antennas can be present without however pointing to a satellite. If, for example, all the Signal A to D variables are equal to "0", it is not possible to determine whether this is because the inputs are not connected to antennas or whether one or more motorised antennas are present, hence the necessity of repeating the first phase 100 in this specific case after the detection of a motorized antenna.

The second phase 200 comprises a first type of processing in the case that all the Signal A to D variables are equal to "0" and a second type of processing in the other case.

If all of the Signal A to D variables are equal to "0", then input A is selected during a first step 201. Azimuth scanning is then carried out during a second step 202. Azimuth scanning consists of sending an instruction to set the antenna to the end of its travel, for example to the east, of sending instructions to the LNB to set the polarisation and the frequency band on a band in which there is at least one service channel for at least one satellite, of setting the tuner and demodulator of the receiver on a service channel then of sending instructions to move it toward the opposite end, for example to the west, until the other end is reached or a signal is detected that is not necessarily the one that corresponds to the required channel.

If a signal is detected at the end of the second step 202, then a third step 203 is carried out that consists of rerunning the first phase 100, thus ending the second phase 200.

If no signal is detected at the end of the second step 202, then a fourth step 204 is carried out. The fourth step 204 consists in selecting the input B. Then, a fifth step 205 realises an azimuth scanning, in the same manner as in the second step 202.

If a signal is detected at the end of the fifth step 205, then a sixth step 206 is carried out that consists in rerunning the first phase 100, thus ending the second phase 200.

If no signal is detected at the end of the fifth step 205, then a seventh step 207 is carried out. The seventh step 207 consists in selecting the input C. Then, an eighth step 208 realises an azimuth scanning, in the same manner as in the second step 202.

If a signal is detected at the end of the eighth step 208, then a ninth step 209 is carried out that consists in rerunning the first phase 100, thus ending the second phase 200.

If no signal is detected at the end of the eighth step 208, then a tenth step 210 is carried out. The tenth step 210 consists in selecting the input B. Then, an eleventh step 211 realises an azimuth scanning, in the same manner as in the second step 202.

If a signal is detected at the end of the eleventh step 211, then a twelfth step 211 is carried out that consists in rerunning the first phase 100, thus ending the second phase 200.

If no signal is detected at the end of the eleventh step 211, then a thirteenth step 213 is carried out. The thirteenth step 213 consists of displaying to the user that no antenna has been detected and that the correct connection of the antenna input of the decoder to a satellite antenna system must be checked. This thirteenth step ends the second phase 200 and also the auto-configuration program without carrying out the third phase 300.

If at least one of the Signal A to D variables is not equal to "0", then systematic detection is performed for each input whose Input A to D variable is equal to "1".

If the Input A variable equals "1", then a fourteenth step is carried out that selects the input A. Then, if the Signal A variable equals "0" then a fifteenth step 215 is carried out, otherwise a sixteenth step 216 is carried out. The fifteenth step 215 is an azimuth scanning step of the same type as the second step 202. The sixteenth step 216 consists of memorizing the channel received then) sending a motion command of an angle greater than the opening of a satellite antenna, for example, 3° to the east or west.

At the end of the fifteenth step 215, a check that a signal is received is made. If a signal is received, then the Signal A variable is set to the value "2" during a seventeenth step 217. If no signal is received, then the Signal A variable is set to the value "0" during an eighteenth step 218.

At the end of the sixteenth step 216, a check is made on whether a signal received corresponds to the channel previously received; if this is the case, the antenna has not moved and therefore it is fixed. If a signal is received, then the Signal A variable is set to the value "1" during a nineteenth step 219. If no signal is received, then the Signal A variable is set to the value "2" during the seventeenth step 217.

If the Input A variable does not equal "1" or the seventeenth, eighteenth or nineteenth step 217 or 218 or 219 is finished, then a check is made on whether the Input B variable equals "1". If the input B variable equals "1" then a twentieth step 220 is carried out that selects the input B. Then, if the Signal B variable equals "0" a twenty-first step 221 is carried out, otherwise a twenty-second step 222 is carried out. The twenty-first step 221 is an azimuth scanning step of the same type as the second step 202. The twenty-second step 222 consists of memorising the channel received and sending a motion command identical to the sixteenth step 216.

At the end of the twenty-first step 221, a check that a signal is received is made. If a signal is received, then the Signal B variable is set to the value "2" during a twenty-third step 223. If no signal is received, then the Signal B variable is set to the value "0" during a twenty-fourth step 224.

At the end of the twenty-second step 222, a check is made on whether a signal received corresponds to the channel previously received; if this is the case, the antenna has not moved and therefore it is fixed. If a signal is received, then the Signal B variable is set to the value "1" during a twenty-fifth step 225. If no signal is received, then the Signal B variable is set to the value "2" during the twenty-third step 223.

If the Input B variable does not equal "1" or the twenty-third, twenty-fourth or twenty-fifth step 223 or 224 or 225 is finished, then a check is made on whether the Input C variable equals "1". If the input C variable equals "1" then a twenty-sixth step 226 is carried out that selects the input C. Then, if the Signal C variable equals "0" a twenty-seventh step 227 is carried out, otherwise a twenty-eighth step 228 is carried out. The twenty-seventh step 227 is an azimuth scanning step of the same type as the second step 202. The twenty-eighth step 228 consists of memorising the channel received then sending a motion command identical to the sixteenth step 216.

At the end of the twenty-seventh step 227, a check that a signal is received is made. If a signal is received, then the Signal C variable is set to the value "2" during a twenty-ninth step 229. If no signal is received, then the Signal C variable is set to the value "0" during a thirtieth step 230.

At the end of the twenty-eighth step 228, a check is made on whether a signal received corresponds to the channel previously received; if this is the case, the antenna has not moved and therefore it is fixed. If a signal is received, then the Signal C variable is set to the value "1" during a thirty-first step 231. If no signal is received, then the Signal C variable is set to the value "2" during the twenty-ninth step 229.

If the Input C variable does not equal "1" or the twenty-ninth, thirtieth or thirty-first step 229 or 230 or 231 is finished, then a check is made on whether the Input D variable equals "1". If the input D variable equals "1" then a thirty-second step 232 is carried out that selects the input D. Then, if the Signal D variable equals "0" a thirty-third step 233 is carried out, otherwise a thirty-fourth step 234 is carried out. The thirty-third step 233 is an azimuth scanning step of the same type as the second step 202. The thirty-fourth step 234 consists of memorising the channel received then sending a motion command identical to the sixteenth step 216.

At the end of the thirty-third step 233, a check that a signal is received is made. If a signal is received, then the Signal D variable is set to the value "2" during a thirty-fifth step 235. If no signal is received, then the Signal D variable is set to the value "0" during a thirty-sixth step 236.

At the end of the thirty-fourth step 234, a check is made on whether a signal received corresponds to the channel previously received; if this is the case, the antenna has not moved and therefore it is fixed. If a signal is received, then the Signal D variable is set to the value "1" during a thirty-seventh step 237. If no signal is received, then the Signal D variable is set to the value "2" during the thirty-fifth step 235.

If the Input D variable is not equal to "1" or the thirty-fifth, thirty-sixth or thirty-seventh step 235 or 236 or 237 is finished, then the second phase 200 ends and the third phase 300 can be carried out.

The third phase 300 comprises a first part of formatting the detection realized during the first and second phases 100 and 200 then a second part of identifying the satellite channels as already known from the configuration information coming from the detection.

As indicated above, if the Input B, Input C and Input D variables equal "0", this means that there is no switch and therefore that the decoder is connected to an antenna that is fixed if the Signal A variable equals "1" or that is a motorised antenna if the Signal A variable equals "2".

In the other cases, this means that there is at least one antenna switch. It is possible to consider, systematically, a four-input switch as the instructions for a four-input switch are supported by two-input switches or to distinguish between the different cases possible: a two-input switch controlled at A and B or at A and C, two cascaded switches offering three inputs controlled at A-B-C or at A-C-D or at A-B-D, and one four-input switch or three cascaded two-input switches controlled at A-B-C-D. The switches are identified according to Input A to D variables that are at "1" at the end of the second phase. For the inputs whose Input A to D variables are at "1", it is sufficient to indicate that no antenna is connected to the input of the switch if the Signal A to D variable associated with the said input is equal to "0", or to indicate that a fixed antenna is connected to the input of the switch input if the Signal A to D variable associated with the said input is equal to "1", or even indicate that a motorised antenna is connected to the input of the switch if the Signal A to D variable associated with the said input is equal to "2".

Once the status of the antenna system is correctly updated, it is possible to move on to the identification of the satellites and channels. For fixed antennas, the entire satellite band is scanned according to a known technique to find all of the accessible channels, the channels are then memorized by indicating, if necessary, the switch control signal to be used to select it. For each motorised antenna, a rough scan of the satellite band is carried out while azimuth scanning with the antenna so as to identify the positions of the antenna that correspond to satellites according to a known technique, then for each satellite found, a satellite band scan is carried out to identify the channels. The channels are then memorized with the angular position of the antenna and possibly the switch input selection command.

It is possible that the same channel can be accessed by several antennas, according to the channel memorisation interface, it is possible to make an automatic choice or to request the user if he wishes to memorize a single access to the channel or all the accesses.

The invention claimed is:

1. Method comprising the steps of:

sending, during a switch detection phase for self configuring an antenna system for satellite receivers, a series of switch input selection commands for a remote antenna switch corresponding to a given range of switch control possibilities, wherein the range is independent of the antenna system use; and sending, also during said switch detection phase for self configuring an antenna system for satellite receivers, at least one series of frequency positioning controls carrying out a satellite band scan, wherein said frequency positioning controls are interlaced between said switch input selection commands and wherein the channels which are identified by carrying out the satellite band scan are memorized by indicating the switch control signals assigned to the switch input to be used to select those channels.

2. Method of claim 1, wherein the series of switch input selection commands are sent with frequency and polarization positioning controls corresponding to memorized satellite service channels, said frequency positioning controls being interlaced between said switch input selection commands.

3. Method of claim 1, wherein during a motorized antenna detection phase, at least one azimuth motion command is sent independently of the presence or absence of an azimuth elevation motorized antenna.

4. Method of claim 1, wherein during said motorized antenna detection phase at least one azimuth motion command sequence is sent independently of the presence or absence of an azimuth elevation motorized antenna.

5. Method of claim 1, comprising at least one switch detection phase and at least one motorized antenna detection phase.

6. Method of claim 5, wherein during said motorized antenna detection phase, the motion controls are sent to the motorized antenna.

7. Method of claim 5, comprising, after said motorized antenna detection phase, a third channel and satellite identification phase in which at least one full scan of the satellite band is carried out for at least one antenna.

8. Method of claim 1, wherein the switch input selection commands comply with the DiSEqC standard.

* * * * *